Jan. 28, 1958 D. W. HAMM 2,821,446
OIL SEALING PISTON RING
Filed Nov. 26, 1954

INVENTOR.
DOUGLAS W. HAMM
BY
Frank E. Liverance, Jr.
ATTORNEY

United States Patent Office 2,821,446
Patented Jan. 28, 1958

2,821,446
OIL SEALING PISTON RING

Douglas W. Hamm, Muskegon, Mich., assignor to Muskegon Piston Ring Company, Muskegon, Mich., a corporation of Michigan Application November 26, 1954, Serial No. 471,242

2 Claims. (Cl. 309—45)

The present invention pertains to a novel piston ring construction, primarily directed to the oil sealing of pistons. The novel piston ring of my invention is adapted to be used in the lower groove of an internal combustion engine piston, such groove being known as the oil groove of a piston. In such types of piston ring receiving grooves, oil conserving piston rings are installed which collect or salvage excess oil from walls of cylinders, which oil is carried through the piston rings to the bottoms of the ring grooves and thence through suitable passages to the interiors of pistons on which installed.

The sealing of a piston to prevent, so far as possible, passage of oil upwardly to the combustion chamber of the engine above the piston is becoming increasingly difficult to attain, particularly in conjunction with high compression V-8 engines having high output, and in which the vacuum in the manifold is becoming increasingly high, reaching 22 to 24 inches of mercury under some conditions of driving. Unless the piston oil ring very thoroughly and completely seals a piston ring groove in which located, oil is drawn around the piston ring and upwardly above the piston, which causes excessive oil burning and consumption, smoky exhaust from the engine and spark plug fouling.

It is a primary object of the present invention to provide a simple, novel, effective piston ring combination which attains such oil sealing in a satisfactory and practical manner.

Figure 1:
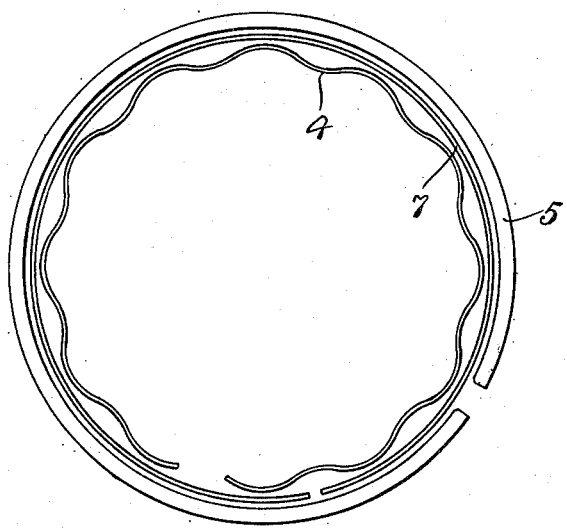

An understanding of the invention may be had from the following description taken in connection with the accompanying drawing, in which, Fig. 1 is a plan view of the piston ring combination of my invention.

Figure 2:
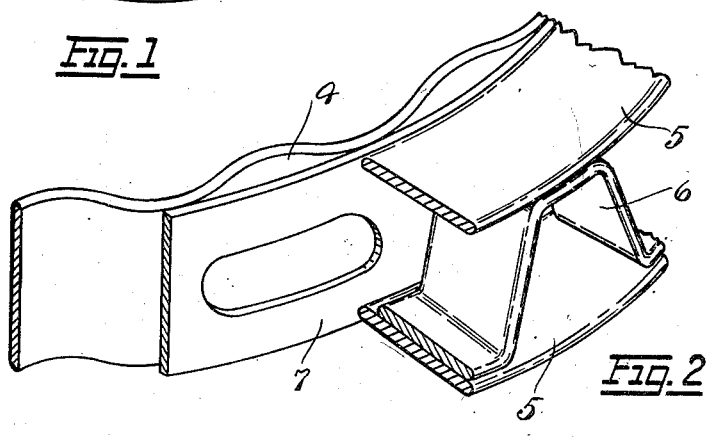
Figure 3:
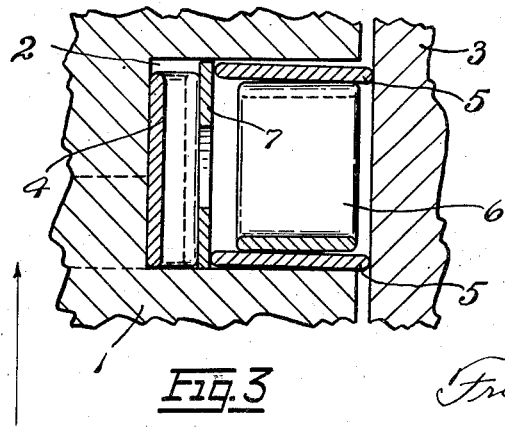

Fig. 2 is a fragmentary perspective illustration of the parts which make up the piston ring and showing their association with each other, and Fig. 3 is an enlarged vertical section through a fragmentary portion of a piston at a ring groove therein, the piston ring of my invention installed in such groove being shown in vertical section.

Like reference characters refer to like parts in the different figures of the drawing.

In Fig. 3, a fragmentary section of a piston 1 has the lower oil groove therein, the piston being indicated as within the walls of a cylinder 3. Such groove 2 from its bottom to the interior of the piston will have oil drainage passages as is common and well known in internal combustion engine pistons.

Within the groove for the installation of the piston ring combination a spring expander 4, corrugated as shown in Fig. 1 to provide inner and outer spaced bearing humps and also vented in the usual manner is placed while outwardly from such expander two parted spaced thin steel rails 5 are placed one at the upper and one at the lower side of a spacer 6. Such spacer 6 as shown in the drawing is a parted continued metallic corrugated member having alternate U-sections closed at upper and lower sides against which the rails may be placed. Preferably in practice the rails may be cemented to the spacer using a cementing material which dissolves and disappears under the effect of lubricating oil and high temperature after installation in the groove.

Such piston ring member, consisting of the spacer 6 and rails 5, is inserted in the piston ring groove against a parted circular shim member 7 which is interposed between the expander 4 and the inner edges of the rails 5. Shim 7 has oil passing vent openings between its upper and lower edges.

The shim 7 between the expander and the rails 5 has a width very close to the axial dimension of the ring groove 2. The maximum width of the shim preferably should not exceed the minimum groove width. For example, if a piston ring groove width is between .1880" and .1890" the maximum shim width preferably should not be over .1880" while its minimum width should be as close as can be practically obtained to such .1880" and in practice will not be less than .1840"; thus the shim should fill the width of the groove as full as possible with the shim movable in the groove.

With such construction and with such narrow tolerances between the edges of the shim 7 and the sides of the ring groove, and with the shim being pressed, through yielding spring pressure from the expander 4, snugly against the rails 5 thus pressing their outer edges against the cylinder wall 3, a particularly effective oil sealing is obtained under all conditions, including conditions of high manifold vacuum in the engine. The sealing principle is that the shim engages and seals the inside edge surfaces of the rings or rails 5 and fits the piston ring groove 2 in such close relationship that a seal is made against the sides of the groove. Thus lubricating oil will not pass around the ring, for example, from one side of the ring groove through the expander and thence outwardly at the other side of the groove. As in Fig. 3, the piston traveling upwardly as indicated by the direction of the arrow, sealing against oil passage around the ring is provided by the substantial complete filling of the width of the groove by the shim 7. When the travel of the piston is reversed with the tilting of the rails 5 correspondingly reversed the same sealing prevails. The indicated tilting in Fig. 3 is exaggerated over what occurs but in all cases the oil which passes through the ring must go through the venting passages supplied in the shim 7 between the upper and lower edges as shown in Figs. 2 and 3 and does not pass between the inner edges of the rails 5 and the outer surface of the shim 7 against which such rails bear.

Ordinarily the shim 7 will be made of a suitable metallic material of a thickness which can be varied but which, desirably, should give the shim a measure of rigidity. This has the advantage of smoothing out the hump pressures of the expander 4, the outer humps of which bear against the inner side of the shim 7 at spaced apart points as shown in Fig. 2 and as is well known. Other materials than steel may be used for said shim without departing from the invention, for example, plastic materials might be used with the same advantages of sealing coming therefrom.

After full test and trial the structure described has proven satisfactory in eliminating adverse conditions coming from imperfect lubricating oil sealing conditions in internal combustion engines, particularly in those engines in which manifold vacuums have been progressively increasing.

The invention is defined in the appended claims and is to be considered comprehensive of all forms of structure coming within their scope.

I claim:

1. In a piston ring adapted to be seated in a ring groove and having a resilient spacer and a pair of parted rails, the improvement comprising: an annular shim seated against the inner face of said ring; said shim having a width such that it forms an oil seal with the side walls of the piston ring groove.

2. In a piston ring adapted to be seated in a ring groove and having a resilient spacer and a pair of parted rails, the improvement comprising: an annular shim seated against the inner face of said ring and bearing against said rails; the spacing between said shim and the side walls of said groove being less than that necessary to permit the passage of oil therethrough.

References Cited in the file of this patent

UNITED STATES PATENTS

| | | |
|---|---|---|
| 1,683,269 | Szekely | Sept. 14, 1928 |
| 1,966,782 | Zeledon | July 17, 1934 |
| 2,281,873 | Engelhardt | May 5, 1942 |
| 2,303,798 | Solenberger | Dec. 1, 1942 |
| 2,460,430 | Phillips | Feb. 1, 1949 |
| 2,468,980 | Huber | May 3, 1949 |